United States Patent [19]
Chiu et al.

[11] Patent Number: 6,055,153
[45] Date of Patent: *Apr. 25, 2000

[54] COMPUTER KEYBOARD WITH ENHANCED COOLING AND TOUCH PAD

[75] Inventors: George Liang-Tai Chiu, Cross River; Thomas Mario Cipolla, Katonah; Lawrence Shungwei Mok, Brewster, all of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/902,178

[22] Filed: Jul. 30, 1997

[51] Int. Cl.[7] .............................. G06F 1/16; G06F 1/20; H03K 17/94; H05K 7/16
[52] U.S. Cl. .......................... 361/687; 361/680; 400/682; 400/82
[58] Field of Search ...................... 361/680, 687; 400/682, 681, 82; 364/781

[56] References Cited

U.S. PATENT DOCUMENTS

| | | | |
|---|---|---|---|
| 5,198,991 | 3/1993 | Pollitt | 364/781 |
| 5,267,127 | 11/1993 | Pollitt | 400/682 |
| 5,502,460 | 3/1996 | Bowen | 361/680 |
| 5,519,570 | 5/1996 | Chung | 361/360 |
| 5,543,787 | 8/1996 | Karidis et al. | 400/682 |
| 5,596,480 | 1/1997 | Manser et al. | 400/682 |
| 5,615,081 | 3/1997 | Ma | 361/680 |
| 5,659,307 | 8/1997 | Karidis et al. | 400/682 |
| 5,706,167 | 1/1998 | Lee | 361/680 |
| 5,717,431 | 2/1998 | Chia-Ying et al. | 400/82 |
| 5,734,548 | 3/1998 | Park | 400/682 |
| 5,745,116 | 4/1998 | Pisutha-Arnond | 345/358 |
| 5,786,775 | 7/1998 | Chang | 400/682 |
| 5,800,085 | 9/1998 | Lee | 400/682 |
| 5,838,263 | 11/1998 | Chang | 361/680 |
| 5,841,635 | 11/1998 | Sadler et al. | 361/680 |

OTHER PUBLICATIONS

Albert Yu, "The Future of Microprocessors", *IEEE Micro*, Dec. 1996, pp. 46–53.

*Primary Examiner*—Leo P. Picard
*Assistant Examiner*—Lisa Lea-Edmonds
*Attorney, Agent, or Firm*—Scully, Scott, Murphy & Presser; Daniel P. Morris, Esq

[57] ABSTRACT

An arrangement and method for enhancing the cooling capacity of portable personal computers. The power dissipation of portable personal computers, especially such as laptop computers or the like, is enhanced through the utilization of a split swivable keyboard adapted to provide for an increased cooling surface area for electronic components generating heat during use of the computer.

12 Claims, 2 Drawing Sheets

COMPUTER KEYBOARD WITH ENHANCED COOLING AND TOUCH PAD

BACKGROUND OF THE INVENTION

The present invention relates to an arrangement for enhancing the cooling capacity of portable personal computers. More particularly, the invention is directed to the enhancing of the power dissipation of portable personal computers, especially such as laptop computers or the like, through the utilization of a swivable keyboard adapted to provide for an increased cooling surface area for electronic components generating heat during use of the computer.

The capacity and performance of portable personal computers, such as laptop computers, notebook computers or the like, has recently been enhanced to such an extent that; for example, since the beginning of 1996, the thermal dissipation requirements of portable personal computers (PCs) have increased from about 10 watts to 20 watts and even higher values. This increase in the thermal dissipation requirements is a result of ever increasing CPU performance and additional functionality; such as DVD, modem, audio and the like, which are provided by future PCs. As elucidated in an article by Albert Yu, "The Future of Microprocessors", IEEE Micro, December 1996, pages 46 through 53, the trend of increasing power dissipation in the form of heat for portable personal computers will continue in the foreseeable future. Thus, at the widely employed A4 form factor for a portable personal computer; for instance, the cooling limit for a portable PC without a cooling fan is currently approximately 15 to 20 watts. Thus, providing a greater cooling capacity than the current limits in order to meet the anticipated thermal dissipation requirements of future portable personal computers, represents not only a potential competitive advantage in industry, but also provides a significant product differentiation from currently available and commercially sold portable personal computers.

SUMMARY OF THE INVENTION

In order to meet the requirements for enhancing the cooling capacities of portable personal computers; for instance, such as laptop computers, notebook computers or the like which ordinarily each include a bottom keyboard and an openable display panel which is hingedly connected with the rear edge of the keyboard housing, whereby the display panel movable between a layflat closed position over the keyboard into an upwardly extending opened position, the keyboard, upon opening upward pivoting of the display panel is separated into two keyboard portions. This is accomplished in that the keyboard positions are articulated by a gear and linkage system or other means to the display panel in order to be angularly swung apart by a predetermined extent. This separation of the keyboard into separate portions will provide for an enhanced surface area between the keyboard portions for dissipating heat which is generated during computer operation, such as heat which is encountered by the functioning of the CPU.

Moreover, the pivoting action imparted to the two halves of the keyboard to separate it into divergent angularly diverging keyboard portions upon raising of the display panel, and in which the two separated keyboard portions are still adapted to be fully operated by a two-handed user of the computer, enables the provision of not only a larger surface area for cooling electronic components located within the keyboard housing, but also facilitates the arranging of a suitable touch pad in the area obtained intermediate the separated keyboard portions, which conceivably may be employed as a pen input device and/or as a mouse.

In order to implement the pivoting motion of the two portions or halves of the swivable keyboard from an initially closed or contacting position in which they are in the form of a standard keyboard compatible with the known A4 format of a laptop computer, there is provided a gear train and linkage arrangement between the bottom keyboard and the display panel. The gear and linkage arrangement is articulated in response to the opening or raising up of the display panel housing such that the linear displacement of a gear rack in response to the rotation of a cooperating pinion or the like will cause a linkage system to rotate or swivel the split keyboard into two keyboard halves or portions into mutually angled apart positions, thereby exposing therebetween a large cooling surface area for electronic components contained in the keyboard housing. Conversely, in order to meet the A4 factor form for the laptop computer, the closing or folding down of the display panel so as to position it in a layflat position on the upper surface of the keyboard housing, produces a reverse motion of the gear train and therewith interconnected linkage system thereby swiveling the portions of the keyboard together into their closed contiguous position located within the perimeter of the keyboard housing.

Accordingly, it is an object of the present invention the provide an arrangement for a portable personal computer which will increase the cooling capacity thereof during operation.

A more specific object of the invention resides in the provision of an arrangement for increasing the cooling capacity of a portable personal computer which is in the form of a laptop computer, wherein the opening of a display panel hinged to a bottom keyboard housing will cause a gear train and linkage system or, alternatively, a motor-driven lead screw, to swivel two halves or portions of a split keyboard into a spaced apart angled position so as to provide for an greater exposed surface area between the keyboard portions for cooling the electronics contained in the keyboard housing.

BRIEF DESCRIPTION OF THE DRAWINGS

Further objects and advantages of the invention may now be more readily ascertained from the following detailed description, taken in conjunction with the accompanying drawings; in which.

DESCRIPTION OF A PREFERRED EMBODIMENT

Figure 1:
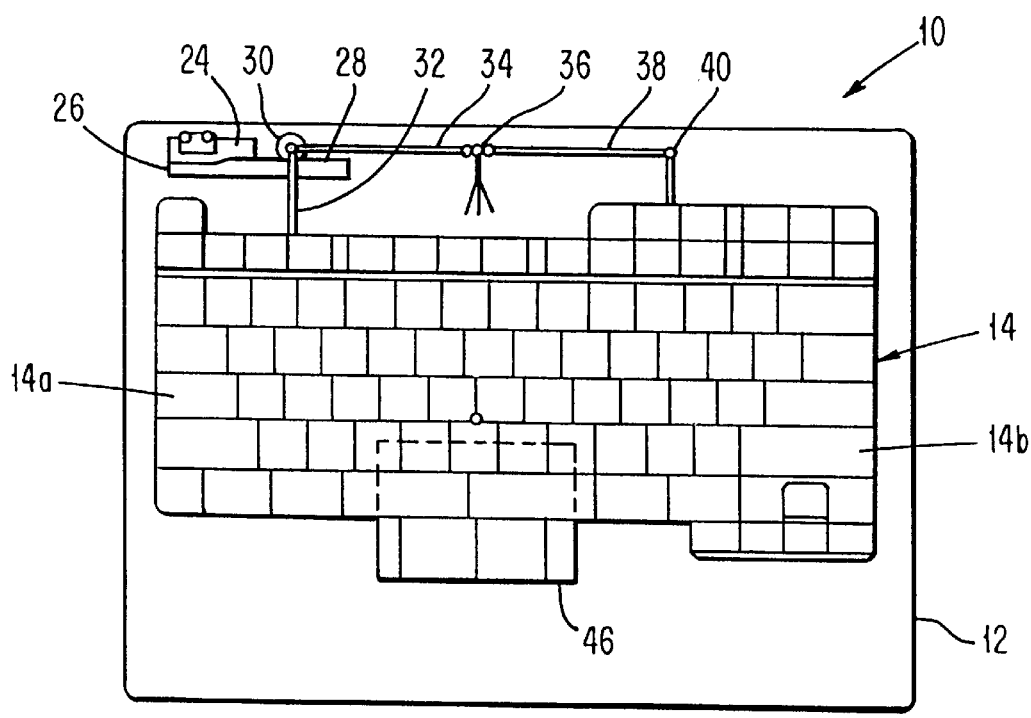
FIG. 1 illustrates a top plan view of a swivable split keyboard pursuant to the invention shown in the closed position of a laptop computer, the display panel of the computer having been removed for purposes of clarity.
Figure 2:
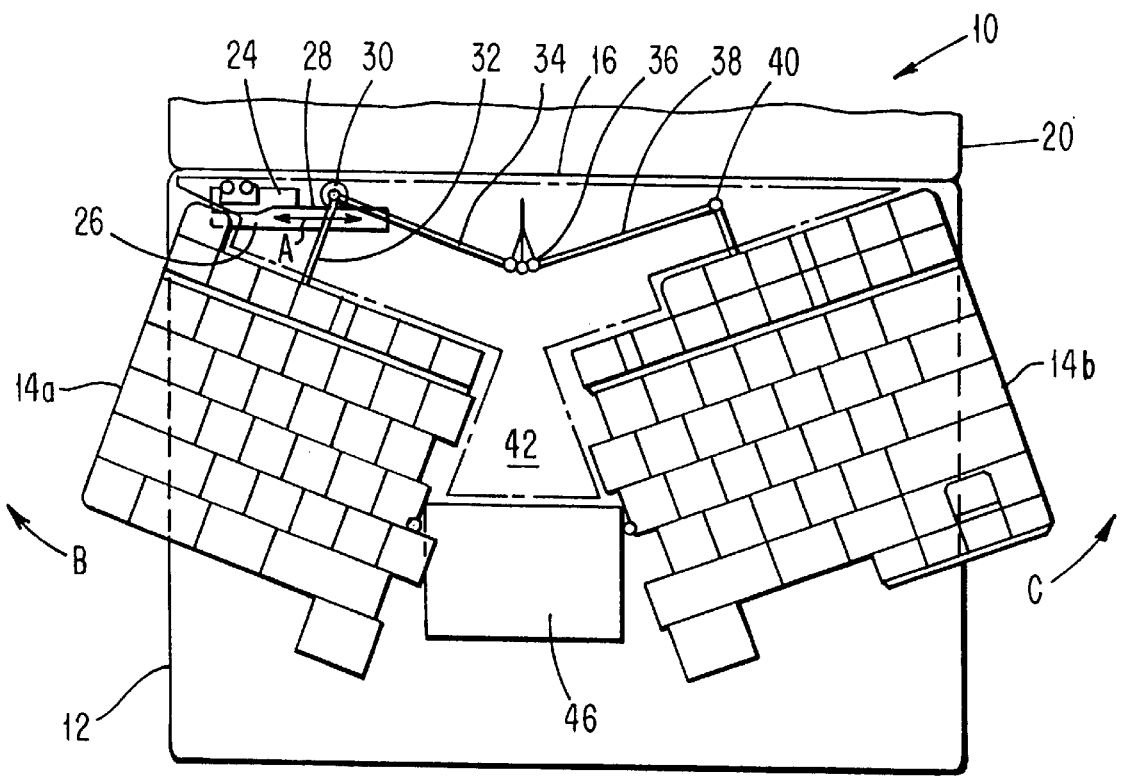
FIG. 2 illustrates the keyboard shown as having been swiveled into separated keyboard portions in an operative position of the computer responsive to the opening or raising up of the display panel of the computer.

Referring in more specific detail to the drawings, FIGS. 1 and 2 illustrate a laptop computer 10 having a housing 12 for a bottom keyboard 14, wherein a display panel 20 containing a computer screen is hingedly connected to the rear edge 16 of the keyboard housing 12 as is well known in the technology.

In the undeployed or closed position of the laptop computer 10; in effect, in the layflat position of the display panel 20 over the keyboard housing, the entire configuration thereof is in compatibility with existing A4 form factors for ease of carrying the personal computer.

Upon an upward pivoting of the display panel 20 so as to be slightly rearwardly tilted, as illustrated in FIG. 2 of the drawings, the split keyboard 14 is indicated in its swiveled apart position and separated into a left-hand keyboard portion 14a and right-hand keyboard portion 14b adapted for use by a two-handed user of the computer keyboard. The swiveling action which is imparted to the keyboard portions 14a, 14b is automatic when a user raises the display panel 20 so as to open or deploy the computer 10 for use. A cam 24 which is operatively connected to the display panel 20, and which rotates when the display panel is raised, causes a slide member 26 which is fastened to the main body of the computer, or the housing 12 for the keyboard 14 to move to the left in the direction of the arrow A. Attached to the slide member 26 is a gear rack 28, which is an operative interengagement with a pinion 30 and imparts rotation to the latter. This will pivot a link 32 which is connected to the pinion 30 and to the left-hand portion 14a of the keyboard 14 to resultingly swivel portion 14a in the direction of arrow B. Moreover, a further link 34 is attached to the pinion 30 forming a pivoting structure at a joint 36 which concurrently applies a torsional force to a further link 38 which is fastened to the right-hand portion 14 of the keyboard 14. This resultingly causes the right-hand portion 14b of the keyboard to swivel about a pivot point 40 in an opposite orientation, as shown by arrow C, relative to the swiveling direction of the left-hand keyboard portion 14a. This outward swiveling displacement of the keyboard portions 14a, 14b to assume an angularly separated position relative to each other exposes a large surface area 42 therebetween which enhances the cooling capacity of the computer 10 and the electronics contained in the keyboard housing 12.

In order to move the two keyboard portions together, when it is no longer required to employ the personal computer or laptop computer, it is merely necessary to fold the display panel 20 downwardly into its layflat superposition on the keyboard housing 12, which will reverse the sequence of motions of the linkage and gear arrangement and move the keyboard portions 14a, 14b into their closed together positions as shown in FIG. 1.

For a user of the laptop computer 10, this ability of the keyboard portions 14a, 14b to be swiveled apart to a predetermined angular displacement relative to each other is ergonomically natural for effecting two-handed typing. Furthermore, from a thermal point of view, a greater surface area is exposed for increased power dissipation.

Moreover, within the region shown by the phantom lines, there is an area which is normally not in touch with the fingers of a user so as to enable temperatures to rise to 60° C. instead of the 35° C. normally permissible for a computer keyboard. Inasmuch as the heat dissipation is now proportional to 60° C. ambient temperature in lieu of 35° C. ambient temperature, additional cooling capacity is attained, and it is assumed that with these factors it is possible to dissipate an additional 5 watts without the use of a fan and 10 watts with the use of a cooling fan installed in the computer.

Moreover, in view of the swivable split keyboard 14 which exposes a large area towards the front central region between the two swiveled-apart keyboard portions 14a, 14b, it is possible to locate a touch pad 46 at the center of the keyboard housing 12. This touch pad 46 can readily serve as either a pen input device and/or as a mouse, thereby rendering the entire construction simple and highly advantageous in both its function and structure.

Figure 3:
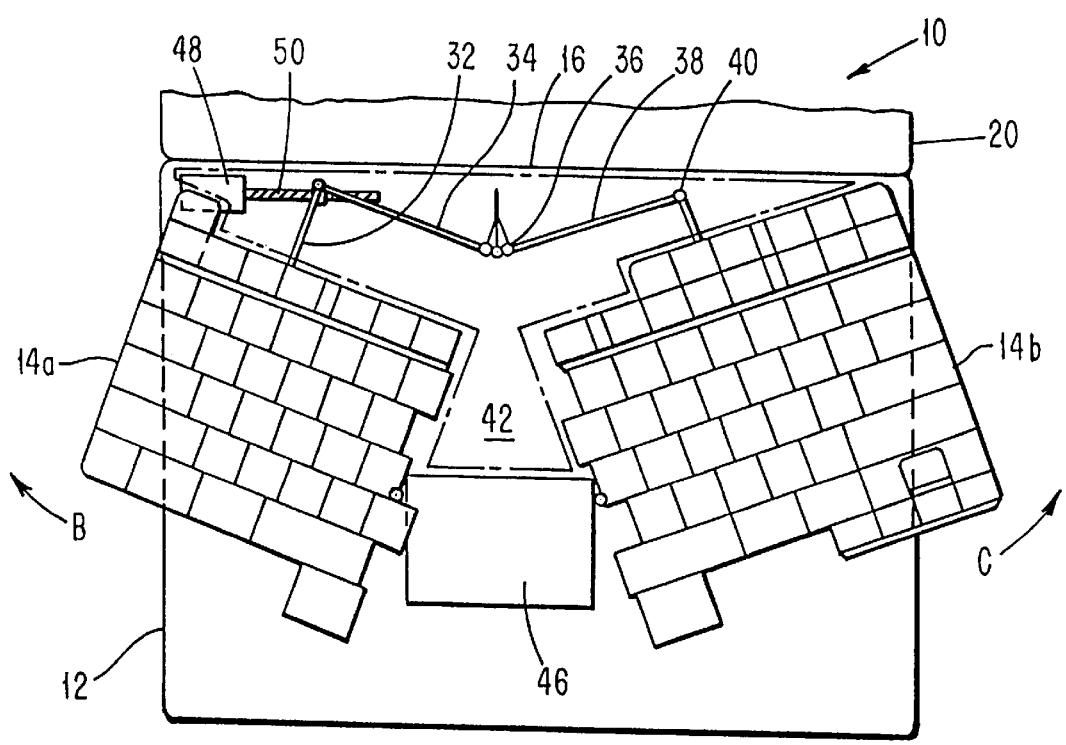
FIG. 3 illustrates a modified embodiment of the invention, with the keyboard shown in the same position as in FIG. 2.

Referring to the embodiment of FIG. 3, in which components similar or identical with the previous embodiment are identified by the same reference numerals, a motor 48 and lead screw 50 provide the motion to move the keyboard instead of the cam, rack and pinion as in the previous embodiment. In this embodiment, when the display panel 20 is opened to a point where there is sufficient clearance for the keyboard to deploy, which would be approximately 45 degrees from the closed position end, an electrical switch (not shown) is closed by the motion of display panel 20 to activate the motor. The motor, which is powered by the same source as the rest of the computer, turns lead screw 50 which is attached to joint 36. The lead screw imparts a linear motion onto joint 36 which, in turn, causes an identical motion in the rest of the system as described in the previous embodiment. It should be clear to those in the art that the attachment point of the motion actuator, such as motor 48 and lead screw 50, does not need to be at joint 36 but can be almost anywhere on any part that moves; for example, as in the previous embodiment.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

Having thus described our invention, what we claim as new, and desire to secure by Letters Patent is:

1. An arrangement for enhancing the cooling capacity of a computer having a bottom housing mounting a keyboard and a display panel hingedly connected to a rear edge of said housing for pivotable raising and closing motion relative to said housing, said keyboard being divided into a first left-hand and a second right-hand portion each rotatably mounted on said housing; and linkage means connecting said keyboard portions with said display panel such that upon said display panel being raised said keyboard portions are swivelled apart so as to provide an increased exposed surface area on said housing for dissipating heat generated by at least one electronic component contained in said housing to the surroundings, said linkage means including a pinion mounted in said housing, a gear rack linearly movable by camming means responsive to pivoting displacement of said display panel, a first linkage arm being operatively connected, respectively to said pinion and to the first keyboard portion for swiveling said first keyboard portion between an angularly outwardly pivoted position in the raised position of said display panel and an inwardly pivoted position within the confines of said housing in the closed position of said display panel, a pivot joint articulating a second linkage arm to said first linkage arm which is operatively connected to said second keyboard portion such that the swiveling motion imparted to said first keyboard portion causes a similar oppositely directed swiveling motion of said second keyboard portion, the swivelled apart position of said keyboard portions exposing a central surface area of said housing for enhanced dissipation of heat to the surroundings, and a touch pad being centrally arranged on said housing so as to be exposed in the swivelled apart positions of said keyboard portions.

2. An arrangement for enhancing the cooling capacity of a computer having a bottom housing mounting a keyboard and a display panel hingedly connected to a rear edge of said housing for pivotable raising and closing motion relative to said housing, said keyboard being divided into a first left-hand and a second right-hand portion each rotatably mounted on said housing; and linkage means connecting said keyboard portions with said display panel such that upon said display panel being raised said keyboard portions are swivelled apart so as to provide an increased exposed surface area on said housing for dissipating heat generated by at least one electronic component contained in said housing to the surroundings, said linkage means including an electric motor means mounted in said housing, a lead screw operated by said motor means responsive to said motor means being activated by pivoting displacement of said display panel, a first linkage arm being operatively connected, respectively, to said lead screw and to the first keyboard portion for swiveling said first keyboard portion between an angularly outwardly pivoted position in the raised position of said display panel and an inwardly pivoted position within the confines of said housing in the closed position of said display panel, a pivot joint articulating a second linkage arm to said first linkage arm which is operatively connected to said second keyboard portion such that the swiveling motion imparted to said first keyboard portion causes a similar oppositely directed swiveling motion of said second keyboard portion, the swivelled apart position of said keyboard portions exposing a central surface area of said housing for enhanced dissipation of heat to the surroundings, and a touch pad being centrally arranged on said housing so as to be exposed in the swivelled apart positions of said keyboard portions.

3. An arrangement as claimed in claim 1 or 2, wherein said linkage means swivels said keyboard portions into a contiguous position upon closing of said display panel over said housing, said keyboard portions being dimensioned to be contained within the confines of said housing in the closed condition of said display panel.

4. An arrangement as claimed in claim 1 or 2, wherein said touch pad comprises a pen input device.

5. An arrangement as claimed in claim 1 or 2, wherein said touch pad comprises a mouse.

6. An arrangement as claimed in claim 1 or 2, wherein said computer comprises a laptop computer.

7. A method of enhancing the cooling capacity a computer having a bottom housing mounting a keyboard and a display panel hingedly connected to a rear edge of said housing for pivotable raising and closing motion relative to said housing, said keyboard being divided into a first left-hand and a second right-hand portion each rotatably mounted on said housing; and linkage means connecting said keyboard portions with said display panel such that upon said display panel being raised said linkage means including a pinion mounted in said housing, a gear rack linearly movable by camming means responsive to pivoting displacement of said display panel, a first linkage arm being operatively connected, respectively, to said pinion and to the first keyboard portion for swiveling said first keyboard portion between an angularly outwardly pivoted position in the raised position of said display panel and an inwardly pivoted position within the confines of said housing in the closed position of said display panel, a pivot joint articulating a second linkage arm to said first linkage arm which is operatively connected second keyboard portion such that the swiveling motion imparted to said first keyboard portion causes a similar oppositely directed swiveling motion of said second keyboard portion, the swivelled apart position of said keyboard portions exposing a central surface area of said housing for enhanced dissipation of heat to the surroundings, and a touch pad being centrally arranged on said housing so as to be exposed in the swivelled apart positions of said keyboard portions.

8. A method of enhancing the cooling capacity of a computer having a bottom housing mounting a keyboard and a display panel hingedly connected to a rear edge of said housing for pivotable raising and closing motion relative to said housing, said keyboard being divided into a first left-hand and a second right-hand portion each rotatably mounted on said housing; and linkage means connecting said keyboard portions with said display panel such that upon said display panel being raised said keyboard portions are swivelled apart so as to provide an increased exposed surface area on said housing for dissipating heat generated by at least one electronic component contained in said housing to the surroundings, said linkage means including electric motor means mounted in said housing, a lead screw operated by said motor means responsive to said motor means being activated by pivoting displacement of said display panel; a first linkage arm being operatively connected, respectively, to said lead screw and to the first keyboard portion for swiveling said first keyboard portion between an angularly outwardly pivoted position in the raised position of said display panel and an inwardly pivoted position within the confines of said housing in the closed position of said display panel, a pivot joint articulating a second linkage arm to said first linkage arm which is operatively connected to said second keyboard portion such that the swiveling motion imparted to said first keyboard portion causes a similar oppositely directed swiveling motion of said second keyboard portion, the swivelled apart position of said keyboard portions exposing a central surface area of said housing for enhanced dissipation of heat to the surroundings, and a touch pad being centrally arranged on said housing so as to be exposed in the swivelled apart positions of said keyboard portions.

9. A method as claimed in claim 7 or 8, wherein said linkage means swivels said keyboard portions into a contiguous position upon closing of said display panel over said housing, said keyboard portions being dimensioned to be contained within the confines of said housing in the closed condition of said display panel.

10. A method as claimed in claim 7 or 8, wherein said touch pad comprises a pen input device.

11. A method as claimed in claim 7 or 8, wherein said touch pad comprises a mouse.

12. A method as claimed in claim 7 or 8, wherein said computer comprises a laptop computer.

* * * * *